United States Patent
Sun et al.

(10) Patent No.: US 11,867,816 B2
(45) Date of Patent: *Jan. 9, 2024

(54) LASER GAS DETECTOR AND LASER GAS DETECTION SYSTEM

(71) Applicant: Hesai Technology Co., Ltd., Shanghai (CN)

(72) Inventors: Kai Sun, Shanghai (CN); Jun Tao, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 162 days.

This patent is subject to a terminal disclaimer.

(21) Appl. No.: 17/354,880

(22) Filed: Jun. 22, 2021

(65) Prior Publication Data
US 2021/0318236 A1 Oct. 14, 2021

Related U.S. Application Data

(63) Continuation of application No. 17/354,789, filed on Jun. 22, 2021, which is a continuation-in-part of (Continued)

(30) Foreign Application Priority Data

Aug. 16, 2018 (CN) .......................... 201810936525.4
Feb. 9, 2021 (CN) .......................... 202110178920.2

(51) Int. Cl.
*G01S 17/88* (2006.01)
*G01M 3/38* (2006.01)
(Continued)

(52) U.S. Cl.
CPC .............. *G01S 17/88* (2013.01); *G01M 3/38* (2013.01); *G01N 21/01* (2013.01); *G01N 21/255* (2013.01);
(Continued)

(58) Field of Classification Search
CPC .. H04Q 9/00; H04Q 2209/00; H04Q 2209/40; H04Q 2209/43; H04Q 2209/50;
(Continued)

(56) References Cited

U.S. PATENT DOCUMENTS 9,189,944 B2 * 11/2015 Johnson, Jr. ............ H04W 4/33
10,440,168 B2 * 10/2019 Endo ........................ H04Q 9/00
(Continued)

FOREIGN PATENT DOCUMENTS

CN 105372199 A 3/2016
CN 205538667 U 8/2016
(Continued)

OTHER PUBLICATIONS

China National Intellectual Property Administration, International Search Report in International Patent Application No. PCT/CN2019/100307 (dated Oct. 30, 2019).
(Continued)

*Primary Examiner* — Franklin D Balseca
(74) *Attorney, Agent, or Firm* — Leydig, Voit & Mayer, Ltd.

(57) ABSTRACT

A laser gas detection system includes a laser gas detector and a near-eye display device. The laser gas detection system provided in the present disclosure incorporates modern display technologies and modern communication facilities to present detection results to a user of the laser gas detection system in various intuitive and highly readable forms. The laser gas detection system is further capable of projecting the detection results to a field of view of the user through the near-eye display device.

17 Claims, 9 Drawing Sheets

Related U.S. Application Data application No. 17/268,122, filed as application No. PCT/CN2019/100307 on Aug. 13, 2019.

(51) Int. Cl.

| | | |
|---|---|---|
| *G01N 21/01* | (2006.01) | |
| *G06T 7/73* | (2017.01) | |
| *G01S 17/04* | (2020.01) | |
| *G01N 21/25* | (2006.01) | |
| *G01N 21/39* | (2006.01) | |
| *G01S 7/48* | (2006.01) | |
| *G01S 17/42* | (2006.01) | |
| *G08B 21/16* | (2006.01) | |
| *H04Q 9/00* | (2006.01) | |
| *G06F 18/40* | (2023.01) | |
| *G06V 20/52* | (2022.01) | |
| *G01N 21/17* | (2006.01) | |
| *G06V 10/10* | (2022.01) | |
| *G06V 20/17* | (2022.01) | |

(52) U.S. Cl.
CPC ............ *G01N 21/39* (2013.01); *G01S 7/4802* (2013.01); *G01S 17/04* (2020.01); *G01S 17/42* (2013.01); *G06F 18/40* (2023.01); *G06T 7/73* (2017.01); *G06V 20/52* (2022.01); *G08B 21/16* (2013.01); *H04Q 9/00* (2013.01); *G01N 2021/0131* (2013.01); *G01N 2021/1795* (2013.01); *G06V 10/17* (2022.01); *G06V 20/17* (2022.01); *H04Q 2209/50* (2013.01)

(58) Field of Classification Search
CPC ......... H04Q 2209/80; H04Q 2209/826; H04Q 2209/84; G01S 17/88; G01S 17/04; G01S 17/42; G01S 7/4802; G06T 7/73; G06V 20/52; G06V 20/17; G06V 10/17; G06F 18/40; G01M 3/38; G01N 21/01; G01N 21/255; G01N 21/39; G01N 2021/0131; G01N 2021/1795; G08B 21/16

See application file for complete search history.

(56) References Cited

U.S. PATENT DOCUMENTS

| | | | |
|---|---|---|---|
| 10,533,965 B2* | 1/2020 | Wang | ................ G01N 27/4075 |
| 10,554,886 B2 | 2/2020 | Rydberg | |
| 10,928,371 B1 | 2/2021 | Smith et al. | |
| 11,222,477 B2 | 1/2022 | Moon et al. | |
| 11,313,752 B2 | 4/2022 | Jourdan | |
| 2014/0349707 A1 | 11/2014 | Bang | |
| 2018/0268581 A1 | 9/2018 | Demuth | |
| 2022/0113290 A1* | 4/2022 | Smith | ................... G01M 3/205 |

FOREIGN PATENT DOCUMENTS

| | | | | | |
|---|---|---|---|---|---|
| CN | 107024440 A | 8/2017 | | | |
| CN | 107035972 A | 8/2017 | | | |
| CN | 206740177 U | 12/2017 | | | |
| CN | 207471129 U | 6/2018 | | | |
| CN | 207527300 U | 6/2018 | | | |
| CN | 108399717 A | 8/2018 | | | |
| CN | 109030374 A | 12/2018 | | | |
| CN | 208705222 U | * | 4/2019 | ............ | G01N 21/17 |
| CN | 208705222 U | | 4/2019 | | |
| WO | 2018038152 A1 | | 3/2018 | | |

OTHER PUBLICATIONS

Chinese Patent Office, First Office Action in Chinese Patent Application No. 201810936525.4 (dated Apr. 15, 2023).
CN/201810936525.4, Office Action, dated Apr. 15, 2023.
U.S. Appl. No. 17/268,122, filed Feb. 12, 2021.
U.S. Appl. No. 17/354,789, filed Jun. 22, 2021.

* cited by examiner

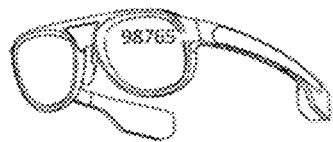 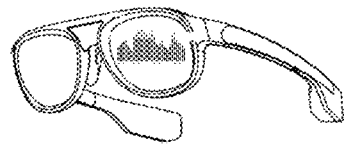 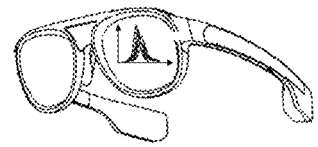
FIG. 3A     FIG. 3B     FIG. 3C
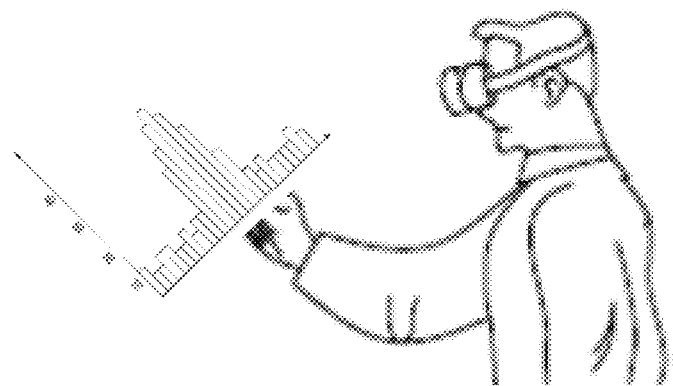
FIG. 4A
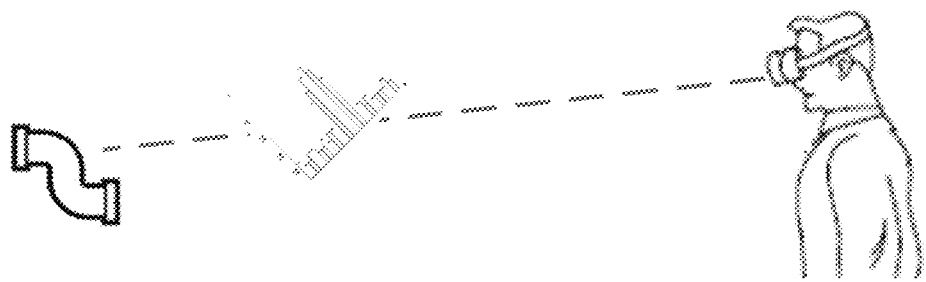
FIG. 4B

LASER GAS DETECTOR AND LASER GAS DETECTION SYSTEM

CROSS-REFERENCE TO RELATED APPLICATIONS

This application is a continuation of copending U.S. patent application Ser. No. 17/354,789, filed on Jun. 22, 2021, which is a continuation-in-part of copending U.S. patent application Ser. No. 17/268,122, filed on Feb. 12, 2021, which is a continuation of International Application No. PCT/CN2019/100307, filed on Aug. 13, 2019, and claims the benefit of Chinese Application No. 201810936525.4, filed on Aug. 16, 2018. This application also claims the benefit of Chinese Application No. CN202110178920.2, filed on Feb. 9, 2021. The disclosures of the above-identified related applications are incorporated by reference in their entireties.

FIELD

The present disclosure generally relates to the technical field of laser detection, and in particular, to a laser gas detector and a laser gas detection system.

BACKGROUND

A laser telemeter has been widely used as a natural gas leak detection apparatus. Based on wavelength modulation spectroscopy, referring to FIG. 1, the telemeter works according to the following basic principles: fixing a laser frequency near a specific absorption peak of methane, modulating the laser frequency at the same time, and performing detection according to a correlation between a frequency modulation harmonic signal and a concentration of a target gas to obtain information about the target gas on an optical path, such as an average concentration of the target gas on the path.

The laser telemeter may be configured to different types of products, such as a product of a gimbal type, a handheld type, or an unmanned aerial vehicle-mounted type. Currently, different types of products may be applied to different scenarios and forms.

Specifically, a gimbal laser telemeter is usually configured to scan and monitor gas leaks in fixed areas (such as natural gas pipelines, gas fields, natural gas stations, and the like). Such telemeters only need to directly upload real-time measured data to a host computer for viewing, and trigger an alarm through the host computer when a leak occurs.

For portable laser telemeters such as a handheld laser telemeter and an unmanned aerial vehicle-mounted laser telemeter, an engineer usually needs to enter a hazardous area or a nearby place to perform on-site measurement. However, such laser telemeters do not need to trigger alarms through a host computer. When an on-site measured concentration value of the target gas is greater than a threshold, the engineer can contact operators for emergency repair.

All of the gimbal laser telemeter, the handheld laser telemeter, and the unmanned aerial vehicle-mounted laser telemeter lack the technology implementation of more quickly and intuitively displaying detection results to the engineer and storing historical detection data for the engineer to access and perform comparative analysis. In addition, due to lack of positioning information, detection results of traditional telemeters cannot be comprehensively utilized, further developed, and used by other artificial intelligence devices and algorithms.

The content of the related art is merely technologies known to the public, and does not represent the prior art in this field.

SUMMARY

In view of at least one defect in the prior art, the present disclosure provides a laser gas detector, including:
- an emitting unit configured to emit a detection laser beam;
- a receiving unit configured to receive an echo signal of the detection laser beam and determine, through analyzing the echo signal, a gas concentration parameter of a detection path along which the laser beam travels; and
- a communication interface adapted to establish a communication connection to a near-eye display device to transmit the gas concentration parameter and project the gas concentration parameter to a field of view of a wearer through the near-eye display device.

According to an aspect of the present disclosure, the communication interface is further adapted to transmit directional information corresponding to the detection path, so that the near-eye display device combines and projects, to the field of view of the wearer through combination, the gas concentration parameter and the directional information corresponding to the detection path.

According to an aspect of the present disclosure, the laser gas detector further includes a positioning unit adapted to provide geographic coordinates.

The communication interface is further adapted to exchange the geographic coordinates with the near-eye display device, so that the near-eye display device combines and projects the gas concentration parameter and the geographic coordinates to the field of view of the wearer.

According to an aspect of the present disclosure, the laser gas detector is a handheld laser methane telemeter, further includes a visible beam emitting unit configured to emit a visible beam which has a propagation direction corresponding to a direction indicated by the detection path along which the detection laser beam travels, and is adapted to provide the directional information.

According to an aspect of the present disclosure, the laser gas detector further includes a red dot sight configured to provide the directional information.

According to an aspect of the present disclosure, the laser gas detector is a gimbal laser methane telemeter adapted to provide the directional information through a gimbal.

According to an aspect of the present disclosure, the laser gas detector is an unmanned aerial vehicle-mounted laser methane telemeter adapted to provide the directional information through an unmanned aerial vehicle.

The laser gas detector provided in the present disclosure can be used in combination with the near-eye display device, which has the communication interface capable of transmitting data and control instructions, can transmit a detection result back to the near-eye display device for display, and can also provide information about a directional angle to the near-eye display device. Working efficiency of an engineer at a work site and convenience of viewing the detection result can be improved. In addition, a detection record is presented in a form of labels on a map through the near-eye display device, so that the engineer can access a detection record or inspection map data of a specific historical time period or expand a detection range to make comprehensive judgements, and the detection record is projected to a field of view of the engineer, which is clearer for the engineer to make judgements.

The present disclosure further provides a laser gas detection system, including:
- a laser gas detector configured to emit a detection laser beam for detecting a gas concentration parameter of a detection path along which the laser beam travels, where the laser gas detector has a communication interface; and
- a near-eye display device configured to establish a communication connection to the laser gas detector through the communication interface, obtain the gas concentration parameter of the detection path, generate a to-be-projected image according to the gas concentration parameter, and project the to-be-projected image to a field of view of a wearer.

According to an aspect of the present disclosure, the near-eye display device projects the to-be-projected image to a fixed position in the field of view of the wearer.

According to an aspect of the present disclosure, the near-eye display device is configured to obtain directional information corresponding to the detection path and project the to-be-projected image to a position in the field of view of the wearer that is consistent with an indicated direction.

According to an aspect of the present disclosure, the near-eye display device is configured to collect image data including a detection position, identify the detection position and project the to-be-projected image to the detection position in the field of view of the wearer.

According to an aspect of the present disclosure, the laser gas detector is a handheld laser methane telemeter, includes a visible beam emitting unit configured to emit a visible beam which has a propagation direction corresponding to a direction of the detection path along which the detection laser beam travels, and is adapted to provide the detection position. The near-eye display device recognizes a spot of the visible beam in the image data to locate the detection position.

According to an aspect of the present disclosure, the laser gas detector further includes a red dot sight configured to provide the detection position.

The near-eye display device recognizes a red dot in the red dot sight in the image data to locate the detection position.

According to an aspect of the present disclosure, the near-eye display device is configured to obtain geographic coordinates of the detection position of the laser gas detector and project the to-be-projected image to the geographic coordinates in the field of view of the wearer.

According to an aspect of the present disclosure, the near-eye display device is configured to construct a historical inspection map and project the historical inspection map to the field of view of the wearer.

According to an aspect of the present disclosure, the near-eye display device is communicably connected to a server and/or other terminal devices and transmits the gas concentration parameter and/or the to-be-projected image to the server and/or the other terminal devices.

According to an aspect of the present disclosure, the near-eye display device is communicably connected to a server and/or other terminal devices, and the near-eye display device sends an alarm to the wearer, sends an alarm to the server, and/or transmits a distress signal to the other terminal devices when the gas concentration parameter is greater than a gas concentration threshold.

According to an aspect of the present disclosure, the near-eye display device is communicably connected to the server and/or the other terminal devices, and the near-eye display device is configured to collect and recognize voice instructions of the wearer, obtain a gas concentration parameter and/or a to-be-projected image within a specific time period from the server and/or the other terminal devices according to the voice instructions and project the gas concentration parameter and/or the to-be-projected image to the field of view of the wearer.

The laser gas detection system provided in the present disclosure presents detection results of the telemeter to an engineer in an intuitive and highly readable form of direct projection to the field of view through virtual reality or augmented reality display technologies and communication facilities. The whole process may be conducted without manual operations, which frees hands. In addition, a time interval from the obtaining of the detection result to the presentation of the data is very short, which is substantially similar to real-time interaction, so that convenience can be improved. An engineer can interact with the near-eye display device through voice, and the near-eye display device also has functions such as automatic alarming, which greatly improves working efficiency of detection and emergency repair, and ensures environmental safety and personnel safety during gas mining and transportation.

The present disclosure further provides a near-eye display device, including:
- a first communication apparatus configured to establish a communication connection to a communication interface of a laser gas detector;
- one or more processors;
- a memory configured to store one or more programs to be executed by the one or more processors; and
- a near-eye display screen; wherein
- the one or more programs comprise instructions used to perform the following steps:
  - obtaining a gas concentration parameter of a target path from the laser gas detector through the first communication apparatus;
  - generating a to-be-projected image according to the gas concentration parameter; and
  - projecting the to-be-projected image to a field of view of a wearer through the near-eye display screen.

According to an aspect of the present disclosure, the one or more programs further include instructions used to perform the following step:
- projecting the to-be-projected image to a fixed position in the field of view of the wearer through the near-eye display screen.

According to an aspect of the present disclosure, the one or more programs further include instructions used to perform the following steps:
- obtaining directional information of a detection position of the laser gas detector through the first communication apparatus; and
- projecting, through the near-eye display screen, the to-be-projected image to a position in the field of view of the wearer that is consistent with an indicated direction.

According to an aspect of the present disclosure, the one or more programs further include instructions used to perform the following steps:
- obtaining a detection position of the laser gas detector through the first communication apparatus; and
- projecting the to-be-projected image to the detection position in the field of view of the wearer through the near-eye display screen.

According to an aspect of the present disclosure, the near-eye display device further includes a man-machine interface. The man-machine interface further includes:

a microphone configured to collect voice instructions of the wearer; and a voice recognition unit communicably connected to the microphone and configured to recognize the voice instructions of the wearer and generate a corresponding control signal; and the man-machine interface transmits the control signal to the laser gas detector through the first communication apparatus to control the laser gas detector to be turned on and/or scan and inspect the target path.

According to an aspect of the present disclosure, the gas concentration parameter includes a gas concentration value, the near-eye display device further includes a second communication apparatus configured to be communicably connected to a server and/or other terminal devices, and the one or more programs further include instructions used to perform the following steps:

sending an alarm to the wearer, sending an alarm to the server, and/or transmitting a distress signal to the other terminal devices when a target gas concentration value is greater than a gas concentration threshold.

According to an aspect of the present disclosure, the near-eye display device further includes a second communication apparatus configured to be communicably connected to a server and/or other terminal devices, and the one or more programs further include instructions used to perform the following step:

obtaining historical detection data within a specific time period from the server and/or the other terminal devices and projecting the historical detection data to the field of view of the wearer.

The near-eye display device provided in the present disclosure can be used in combination with a laser gas detection apparatus, which can obtain a detection result of the laser gas detection apparatus through communication apparatuses such as a Bluetooth communication apparatus and project the detection result to a field of view of the engineer in real time, and can project the detection result to a position near a detection position in various intuitive and highly readable forms, facilitating operations of the engineer. The near-eye display device has a function of human-machine interaction, so that the engineer can operate with voice throughout the process, freeing hands and avoiding pollution. The near-eye display device further has functions such as photographing, video recording, and one-key alarming, which can be implemented through voice instructions of the engineer or may be automatically triggered. The near-eye display device may upload a detection result or alarm information through a 5G communication module, and obtain accurate geographic coordinate positions, so that repair personnel can rush to the site in time. In certain embodiments, the geographic coordinate positions may be obtained through a global positioning system.

The present disclosure further provides a data management method of a laser gas detector, including:

establishing, by a near-eye display device, a communication connection to a communication interface of the laser gas detector, and obtaining a gas concentration parameter of a target path through the communication connection;

generating, by the near-eye display device, a to-be-projected image according to the gas concentration parameter; and projecting, by the near-eye display device, the to-be-projected image to a field of view of a wearer.

According to an aspect of the present disclosure, the gas concentration parameter includes a gas concentration value, and the to-be-projected image includes the gas concentration value and/or a detection report generated according to the gas concentration value. The detection report includes one or more of a histogram, a graph, and a color block diagram generated according to the gas concentration value and a measurement time.

According to an aspect of the present disclosure, the near-eye display device is communicably connected to a server and/or other terminal devices, and the data management method further includes:

transmitting, by the near-eye display device, the gas concentration value and/or the detection report to the server and/or the other terminal devices.

According to an aspect of the present disclosure, the near-eye display device is configured to collect image data of the target path, and the data management method further includes:

associating, by the near-eye display device, a target gas concentration value with the image data and transmitting the target gas concentration value and the image data to the server and/or the other terminal devices.

According to an aspect of the present disclosure, the near-eye display device is configured to obtain current position information, and step S104 further includes:

associating, by the near-eye display device, a target gas concentration value with the position information and transmitting the target gas concentration value and the position information to the server and/or the other terminal devices.

According to the data management method provided in the present disclosure, the detection result of the laser gas detection system can be backed up and uploaded, or the image data collected by the near-eye display device may be associated with the current detection result through geographic coordinate information that may be obtained through a global positioning system, and then the associated information is synchronously stored and uploaded to the server or other collaborative engineers through the 5G communication module. The engineer may also download a historical detection record or an inspection map from the server or terminal devices of the other engineers through the near-eye display device, which can help the engineer integrate the information about time and space to make judgments.

BRIEF DESCRIPTION OF THE DRAWINGS

The accompanying drawings are used to provide a further understanding of the present disclosure, and are used to explain the present disclosure in combination with the embodiments of the present disclosure, and do not constitute a limitation to the present disclosure. In the accompanying drawings:

FIG. 3A schematically shows projection of a target gas concentration value to a near-eye range of a wearer according to an exemplary embodiment of the present disclosure.

FIG. 3B schematically shows projection of a gas detection report to the near-eye range of the wearer according to an exemplary embodiment of the present disclosure.

FIG. 3C schematically shows projection of the gas detection report to the near-eye range of the wearer according to an exemplary embodiment of the present disclosure.

FIG. 4A schematically shows projection of the gas detection report to a fixed position within a field of view of the wearer according to an exemplary embodiment of the present disclosure.

FIG. 4B schematically shows projection of the gas detection report to a detection path within the field of view of the wearer according to an exemplary embodiment of the present disclosure.

DETAILED DESCRIPTION

Figure 1:
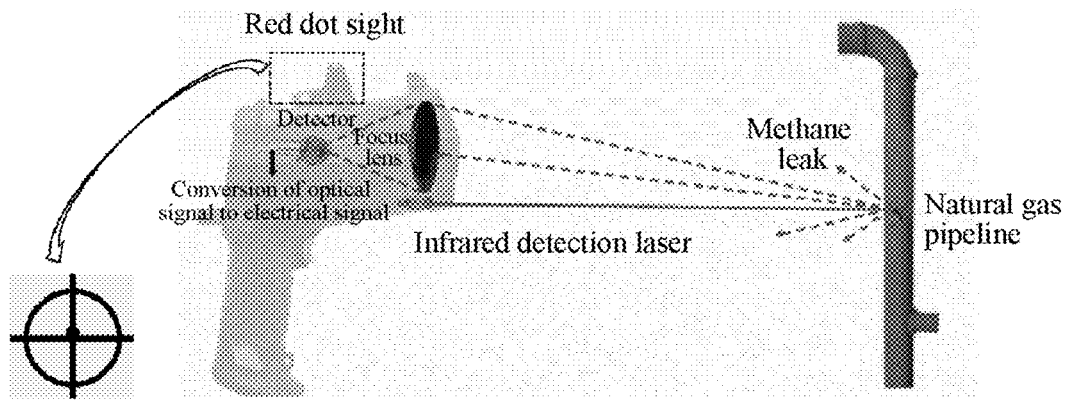
FIG. 1 shows a working principle of a laser gas telemeter.

Exemplary embodiments are described below. As those skilled in the art can realize, the described exemplary embodiments may be modified in various different ways without departing from the spirit or the scope of the present disclosure. Therefore, the drawings and the description are to be considered as illustrative in nature but not restrictive.

In the description of the present disclosure, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that a device or an element must have a particular direction or must be constructed and operated in a particular direction, and therefore, cannot be understood as a limitation to the present disclosure. In addition, the terms such as "first" and "second" are used only for the purpose of description, and should not be understood as indicating or implying the relative importance or implicitly specifying the quantity of the indicated technical features. Therefore, a feature restricted by "first" or "second" may explicitly indicate or implicitly include one or more such features. In the descriptions of the present disclosure, unless otherwise explicitly specified, "multiple" means two or more than two.

In the description of the present disclosure, it should be noted that, unless otherwise explicitly stipulated and restricted, terms "installation", "joint connection", and "connection" should be understood broadly, which, for example, may be a fixed connection, or may be a detachable connection, or an integral connection; or may be a mechanical connection, or may be an electrical connection, or may be mutual communication; or may be a direct connection, or may be an indirect connection by using a medium, or may be an internal communication between two components, or may be an interactive relationship between two components. Persons of ordinary skill in the art may understand the specific meanings of the foregoing terms in the present disclosure according to specific situations.

In the present disclosure, unless otherwise explicitly stipulated and restricted, that a first feature is "on" or "under" a second feature may include that the first and second features are in direct contact, or may include that the first and second features are not in direct contact but in contact by using other features therebetween. In addition, that the first feature is "on", "above", or "over" the second feature includes that the first feature is right above and on the inclined top of the second feature or merely indicates that a level of the first feature is higher than that of the second feature. That the first feature is "below", "under", or "beneath" the second feature includes that the first feature is right below and at the inclined bottom of the second feature or merely indicates that a level of the first feature is lower than that of the second feature.

Many different implementations or examples are provided in the following disclosure to implement different structures of the present disclosure. To simplify the present disclosure, components and settings in particular examples are described below. Certainly, they are merely examples and are not intended to limit the present disclosure. In addition, in the present disclosure, reference numerals and/or reference letters may be repeated in different examples. The repetition is for the purposes of simplification and clearness, and a relationship. Moreover, the present disclosure provides examples of various particular processes and materials, but a person of ordinary skill in the art may be aware of application of another process and/or use of another material.

Embodiments of the present disclosure are described below in detail with reference to the accompanying drawings. It should be understood that the embodiments described herein are merely used to explain the present disclosure but are not intended to limit the present disclosure.

First Aspect

A hallmark feature of an augmented reality/mixed reality (also referred to as hybrid reality sometimes) system is that the systems can fuse real-time images of a real world with digital information. Usually, this is done by overlaying two dimensional (2D) projection texts and/or graphics to a transparent surface or by integrating three dimensional (3D) virtual images with images in an environment. In an augmented reality technology, information is usually overlaid to a background environment of a user. In a mixed reality technology, virtual objects can be mapped to a physical environment. Such visual integration enables users to quickly and easily interact with digital objects to enhance reality experience of the digital objects or improve efficiency of completing some tasks. Combining the augmented reality technology or the mixed reality technology with laser gas telemetry can improve detection efficiency of an engineer and reduce erroneous determination, and can implement functions such as human-machine interaction, data management, and real-time access.

Figure 2:
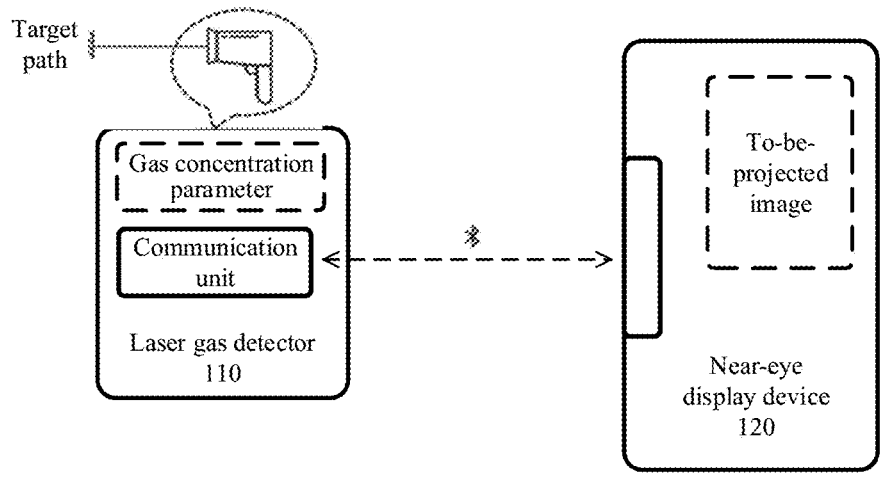
FIG. 2 schematically shows a laser gas detection system according to an exemplary embodiment of the present disclosure.

According to an exemplary embodiment of the present disclosure, as shown in FIG. 2, the present disclosure provides a laser gas detection system 100, including a laser gas detector 110 and a near-eye display device 120. The laser gas detector 110 is configured to emit a detection laser beam for detecting a gas concentration parameter of a target path. The target path is a detection path along which the detection laser beam of the laser gas detector 110 travels. The laser gas detector 110 has a communication interface.

In certain embodiments of the present disclosure, the communication interface may be wired, such as a line data port such as a USB or any other wired interface, or may be wireless. The wireless communication interface may be specifically a Bluetooth module used for near field transmission; or, may be a 5G module used for long-distance data transmission; or, may be a Wi-Fi module used for short-distance data transmission; or may be any other system for transmitting and receiving data wirelessly. The communication interface may be a factory configuration of the laser gas detector 110, or may be mounted later.

The near-eye display device 120 is configured to establish a communication connection to the laser gas detector 110 through the communication interface. By virtue of the communication interface, the laser gas detector 110 and the near-eye display device 120 can perform bidirectional information exchange and sharing. For example, the near-eye display device 120 may obtain data information from the laser gas detector 110 in real time through the communication connection. The data information may be, for example, an average gas concentration parameter on the detection path. Then the near-eye display device 120 generates a to-be-projected image according to the gas concentration parameter and projects the to-be-projected image to a field of view of a wearer in real time (a projection method includes: using a lens as a display screen or information projection at a distance relative to the lens, which is described in detail later). In this way, a detection result of the laser gas detector 110 can be reflected to the engineer in real time through the near-eye display device 120, and the visual presentation can be performed in an intuitive and highly readable form. In addition, the engineer may transmit an operation instruction to the near-eye display device 120 through voice interaction, touch screen sliding, or body motions. The operation instruction is, for example, "turn on the telemeter". After learning the operation instruction, the near-eye display device 120 may transmit an instruction to the laser gas detector 110 through the communication connection to turn on the laser gas detector 110.

It should be noted that the wearer is usually a gas detection engineer. The "engineer" appearing below refers to gas detection personnel wearing the near-eye display device 120. A matched communication connection is established between the near-eye display device 120 worn by the wearer and the laser gas detector 110. For example, if a communication connection is established between a near-eye display device 120 numbered xx1 and a laser gas detector 110 numbered yy1, a gas parameter detected by the laser gas detector 110 numbered yy1 is to be projected to a field of view of a wearer Zhang San wearing the near-eye display device 120 numbered xx1. For example, if a communication connection is established between the near-eye display device 120 numbered xx1 and a laser gas detector 110 numbered yy2, a gas parameter detected by the laser gas detector 110 numbered yy2 is to be projected to a field of view of the wearer Zhang San wearing the near-eye display device 120 numbered xx1. In addition, the gas parameter data detected by the laser gas detector 110 numbered yy2 may be then shared with the laser gas detector 110 numbered yy1 or the near-eye display device 120 numbered xx2, through the communication interface of the laser gas detector 110 numbered yy2 or of the near-eye display device 120 numbered xx1, so that the gas parameter detected by the laser gas detector 110 numbered yy2 is to be projected to a field of view of the wearer Li Si wearing the near-eye display device 120 numbered xx2.

According to an exemplary embodiment of the present disclosure, as shown in FIG. 3A, FIG. 3B, and FIG. 3C, in the laser gas detection system 100, the gas concentration parameter includes a target gas concentration value, and the to-be-projected image includes the following: (1) The target gas concentration value, that is, a detected value of the laser gas detector 110 is directly displayed. As shown in FIG. 3A, a target gas concentration value (98765) is projected to a field of view of the engineer through the near-eye display device 120. Since the target gas concentration value is generated according to the gas concentration parameter, and the gas concentration parameter is a result detected by the laser gas detector 110 in real time and is transmitted to the near-eye display device 120 in real time, the target gas concentration value projected to the field of view of the engineer may change in real time. (2) A detection report generated according to the target gas concentration value. As shown in FIG. 3B and FIG. 3C, the detection report projected to the field of view of the engineer includes one or more of a histogram, a graph, and a color block diagram that are generated according to the target gas concentration value and a measurement time. FIG. 3B is a histogram generated according to the detection result, and FIG. 3C is a graph generated according to the detection result. Color blocks may also be displayed, for example, different color blocks are used to identify different target gas concentration ranges. Those skilled in the art can easily understand that other to-be-projected images that can be used to represent the detection result of the laser gas detector 110 are all applicable to the present disclosure, which all fall within the protection scope of the present disclosure.

Figure 4C:
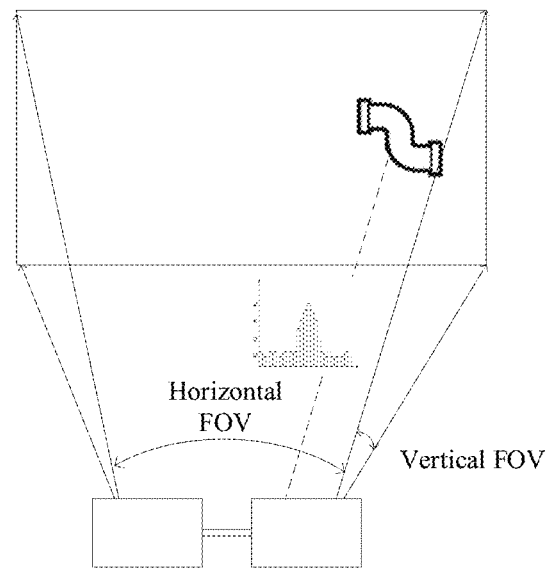
FIG. 4C schematically shows a rear view (behind a lens) view of FIG. 4B.

According to an exemplary embodiment of the present disclosure, by using the near-eye display device 120 as a display screen, the to-be-projected image may be projected to a fixed position in the field of view of the engineer. As shown in FIG. 3A, FIG. 3B, and FIG. 3C, the near-eye display device 120 projects the to-be-projected image to a near-eye range of the engineer. In addition, the near-eye display device 120 may also project the to-be-projected image to other fixed positions in the field of view of the engineer, such as a position at a distance of 1 meter directly in front (as shown in FIG. 4A). Alternatively, the near-eye display device 120 may also obtain directional information corresponding to the detection path from the laser gas detector 110 through the communication connection, and then combine the gas concentration parameter with the directional information corresponding to the path to project the gas concentration parameter to a position at a distance such as 1 meter directed by the path. As shown in FIG. 4B and FIG. 4C, a pipeline is at a right-hand position of the field of view of the engineer, and the detection path (shown by a dashed line) is also relatively deviated toward the right. Therefore, the data (such as the histogram) may be projected to a position at a distance of 1 m in a detection direction. The presentation modes also fall within the protection scope of the present disclosure.

Figure 5A:
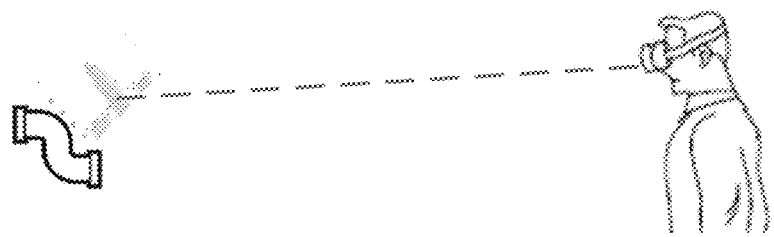
FIG. 5A schematically shows projection of the gas detection report to a real-time detection position within the field of view of the wearer according to an exemplary embodiment of the present disclosure.
Figure 5B:
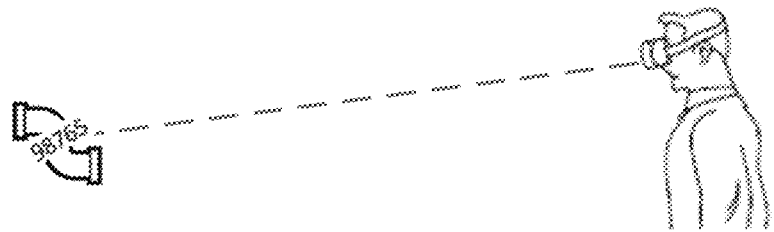
FIG. 5B schematically shows projection of the target gas concentration value to the real-time detection position within the field of view of the wearer according to an exemplary embodiment of the present disclosure.

According to an exemplary embodiment of the present disclosure, as shown in FIG. 5A and FIG. 5B, the near-eye display device 120 is configured to obtain a real-time detection position of the laser gas detector 110 and project the to-be-projected image to the detection position in the field of view of the engineer. In other words, the detection result is mapped to the physical environment, rather than just overlaid on top of a background view. For example, the detection result is displayed at the real-time detection position through obtaining a current detection position of the laser gas detector 110. For a gimbal or unmanned aerial vehicle-mounted laser gas detector, information about a directional angle may be obtained through a geomagnetic sensor or a gyroscope mounted to the laser gas detector. For a gimbal laser methane telemeter, the directional information, that is, the current detected direction may be provided by a gimbal. For an unmanned aerial vehicle-mounted laser methane telemeter, the directional information may be provided by an unmanned aerial vehicle.

For a hand-held laser gas detector, when light is relatively dark or a to-be-detected position is relatively close, a visible beam may be emitted through a visible beam emitting apparatus to indicate the to-be-detected position, and the near-eye display device may recognize and locate the to-be-detected position according to a spot of the visible beam, and project the to-be-projected image to the detection position in the field of view of the engineer. If the light is bright or the to-be-detected position is far away or in other situations where an indicator spot cannot be seen clearly, a red dot sight may be used. Referring to FIG. 1 herein, the red dot sight is disposed on the top of the laser gas detector, and there is a red dot in a field of view of the red dot sight. A front view of the field of view of the red dot sight is shown at a lower left corner of FIG. 1. During use, firstly aligning the red dot of the red dot sight to a green dot of the visible indicator light, and then, when the green dot is invisible, aiming at the detection position with the red dot in the red dot sight rather than the green dot.

In FIG. 5B, the near-eye display device 120 projects the target gas concentration value to the detection position in the field of view of the engineer in real time. In FIG. 5A, the near-eye display device 120 projects, to the detection position in the field of view of the wearer in real time, the histogram generated according to the target gas concentration value.

According to an embodiment of the present disclosure, the laser gas detector 110 may comprise a distance measurement unit or perform distance measurement according to the detection laser beam. Therefore, in addition to the above manner of obtaining the directional angle, other technical means of obtaining physical coordinates of the detection position in real time all fall within the protection scope of the present disclosure.

According to an embodiment of the present disclosure, in addition to the above data transmission direction from the laser gas detector 110 to the near-eye display device 120, reversed data transmission may also be allowed. For example, the near-eye display device 120 is configured to collect and recognize a voice instruction of the engineer, generate a control signal according to the voice instruction of the engineer, and transmit the control signal to the laser gas detector 110 through the communication connection to control the laser gas detector 110 to operate according to the control signal.

The human-machine interaction between the near-eye display device 120 and the engineer is performed through voice. For example, when the engineer says: "start detection", the near-eye display device 120 receives the instruction and transmits a start command to the laser gas detector 110, and the laser gas detector 110 starts detection.

According to an exemplary embodiment of the present disclosure, the near-eye display device 120 controls, according to the voice command of the engineer, the laser gas detector 110 to be turned on and/or scan and inspect the target path.

The laser gas detector 110 may also have a scanning unit, which can scan and inspect the target path through rotation. For example, when the engineer arrives at a site and says to the near-eye display device 120: "let the telemeter scan", the laser gas detector 120 starts scanning and detection around a person to form gas detection data on a cross-section or a surrounding surface.

Figure 6:
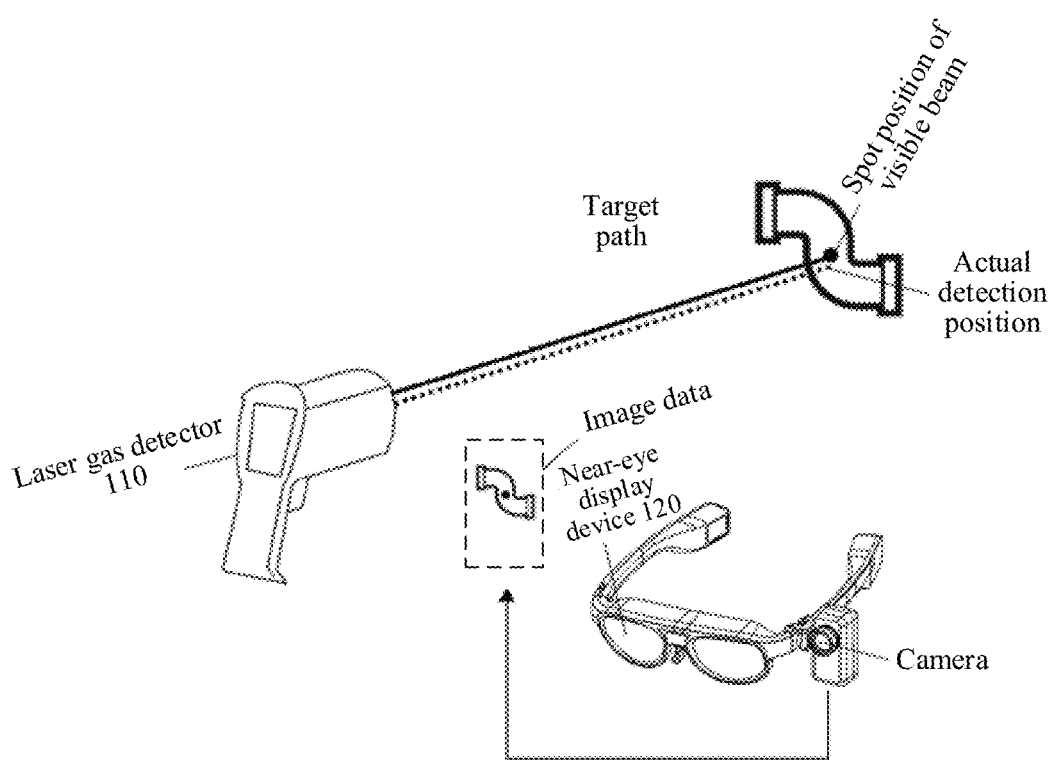
FIG. 6 schematically shows an image of a target path captured by a near-eye display device according to an exemplary embodiment of the present disclosure.

According to an exemplary embodiment of the present disclosure, the near-eye display device 120 is configured to collect image data of a target path, a detection position, or a to-be-detected object such as a pipeline, and identify the real-time detection position of the laser gas detector 110 in the image data. As shown in FIG. 6, a camera of the near-eye display device 120 may be invoked as an image collection apparatus to take photographs or record videos, and the collection of the image data may be controlled in the following three manners: a. when the engineer wants to take a photograph of a place where a gas leak may occur, photographing is controlled through voice interaction; b. when a detected target gas concentration value is greater than a gas concentration threshold value (set in the near-eye display device 120), photographing is automatically triggered; and c. once the engineer completes detection of a place, the engineer directly takes a photograph of the place to generate inspection map data for subsequent viewing and invoking.

According to an exemplary embodiment of the present disclosure, the laser gas detector 110 has a visible beam emitting apparatus. The visible beam emitting apparatus is configured to emit a visible beam to identify the real-time detection position of the laser gas detector 110, and the near-eye display device 120 recognizes a spot of the visible beam in the image data to locate the real-time detection position.

Figure 7:
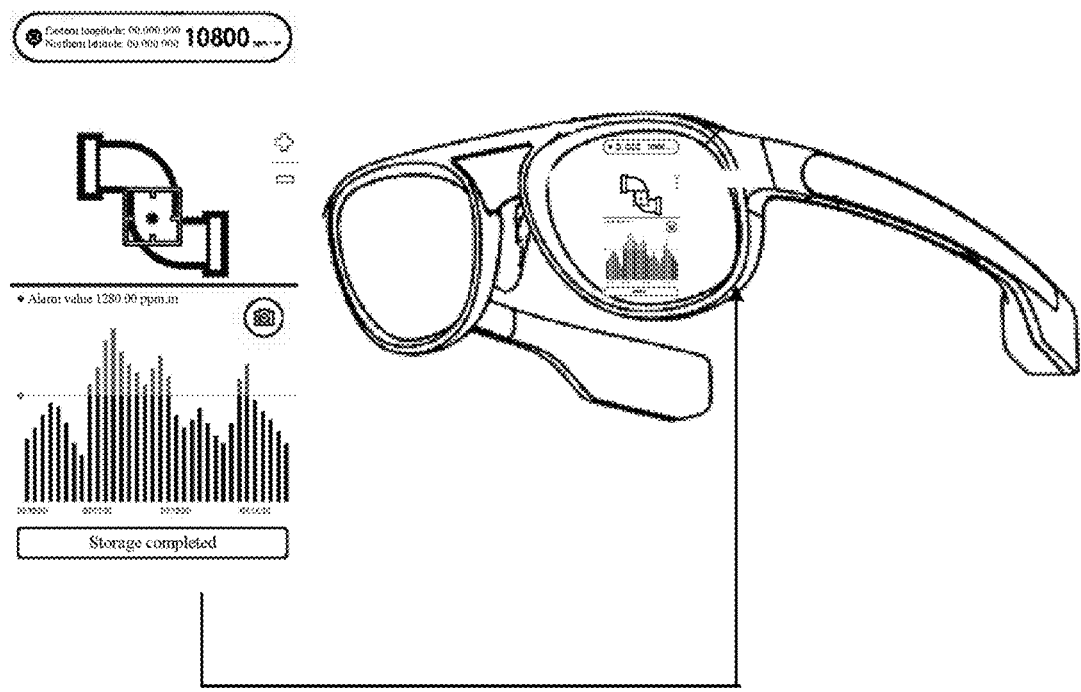
FIG. 7 schematically shows characterization processing performed by the near-eye display device on the detection position according to a visible beam spot according to an exemplary embodiment of the present disclosure.

As shown in FIG. 6, the visible beam emitting apparatus emits a visible beam parallel to the detection laser beam, and an actual detection position is identified with a spot position of the visible beam. As shown in FIG. 7, the near-eye display device 120 may use an image recognition module to recognize, from the image data, a pixel corresponding to the visible spot of the visible beam by using differences in colors and brightness, and then mark a rectangular area by using the pixel as a center to characterize the area. For example, the image data collected by the near-eye display device 120 may be associated with the target gas concentration value and/or the detection report generated according to the target gas concentration value, to generate the to-be-projected image. In other embodiments of the present disclosure, the characterization of the area may also be implemented in other forms. For example, a handheld device that can communicate with the near-eye display device 120 may be provided to the engineer, and the engineer marks an area in the image data projected to the field of view to show a leak point or a to-be-detected position.

Figure 8:
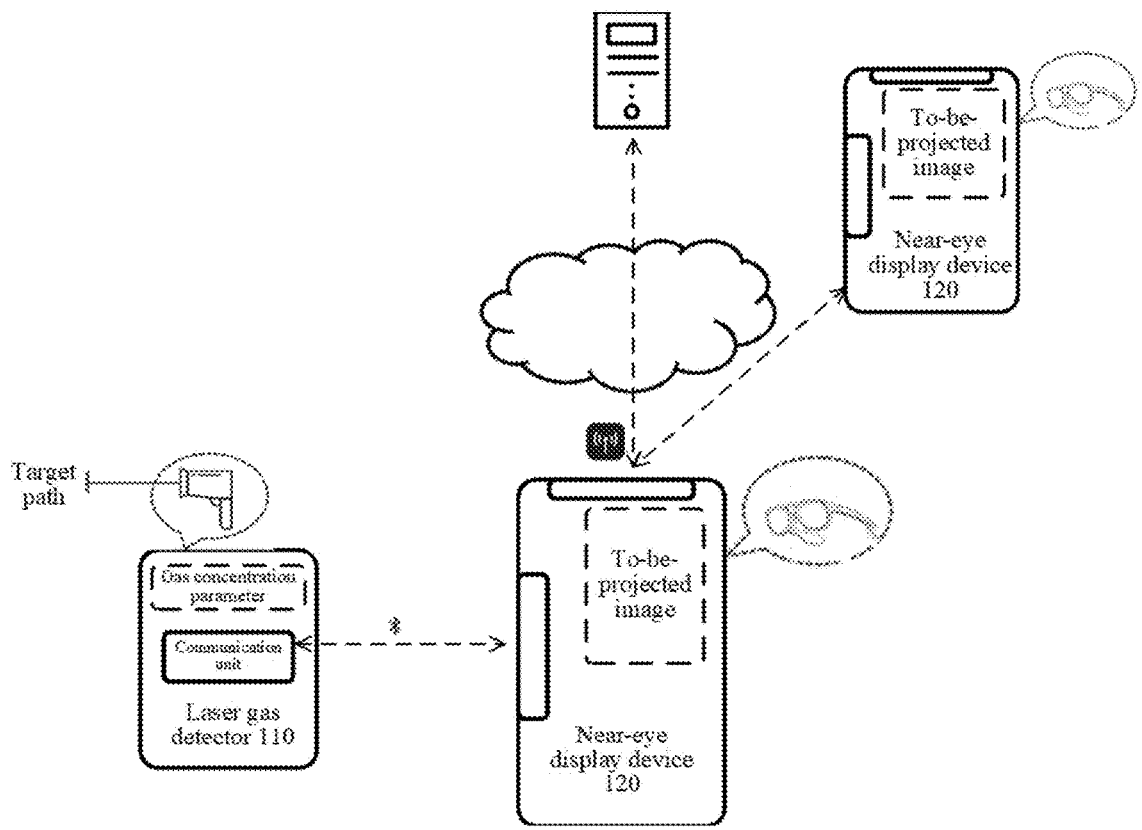
FIG. 8 schematically shows a laser gas detection system according to an exemplary embodiment of the present disclosure.

According to an exemplary embodiment of the present disclosure, as shown in FIG. 8, the near-eye display device 120 is communicably connected to a server and/or other terminal devices and transmits the target gas concentration value and/or the detection report to the server and/or the other terminal devices in real time.

The near-eye display device 120 is communicably connected to a server and/or other terminal devices. For example, a connection is established through a 5G cellular mobile network. The target gas concentration value and/or the detection report are/is transmitted to the server in real time, and the server collects and manages a target gas concentration value and/or a detection report obtained from the same data processing terminal (which, for example, is the near-eye display device, and the near-eye display device is an embodiment of the data processing terminal, helping the engineer obtain a detection result more intuitively and quickly, and other engineers may also use data processing terminals of other forms such as a mobile phone) or a different data processing terminal.

In this embodiment, the near-eye display device 120 uploads, to the server, real-time detection data or a chart generated based on the detection data, so that each engineer can participate in uploading, integration, and management of data. By integrating data from a plurality of data management terminals, engineers or server-side management personnel can have macroscopic understanding of target gas concentration distribution in a managed area. For example, when a target gas concentration that is relatively high but does not exceed an alarm value is detected, the engineers tend to think that there may be a leak point near the position. However, due to flow and diffusion of gases, it is usually difficult to determine an exact position of the leak point. The engineers may obtain, from the server, target gas concentration data at nearby positions uploaded from other data management terminals (such as near-eye display devices worn by engineers working nearby), and accurately determine a direction of the leak point by combining environmental factors. In addition, since a platform for processing data may be provided to the engineers, all of the engineers can participate in real-time leak analysis, discussion of emergency repair plans, and decision-making, helping deal with large-scale multi-point leaks, and can quickly assess and predict scope of impact and involved areas comprehensively after the leaks, thereby providing timely data information support for emergency repair and evacuation or early warning.

In another exemplary embodiment of the present disclosure, each laser gas detection system 100 may have an identification number (ID). For example, an engineer A uses a laser gas detection system 100 with an ID XX1 for detection, and a manager B stays in the office. If A encounters a problem (such as a fault of the laser gas detector 110 or a doubt about on-site detection data), and wants B to resolve the problem, A says to the near-eye display device 120: "connect to B". B sees the request to establish communication that is transmitted by the laser gas detection system 100 with the ID XX1, and agrees to the request, and A continues to say to the near-eye display device 120: "show B current detection status/telemeter fault status". The near-eye display device 120 receives the instruction, and retrieves and displays fault data or a gas detection report of the laser gas detector 110 remotely (for example, through a 5G cellular mobile network), and the manager B assists the engineer A in dealing with the fault/problem.

According to an exemplary embodiment of the present disclosure, the near-eye display device 120 is communicably connected to a server and/or other terminal devices, and the near-eye display device 120 sends an alarm to the engineer, sends an alarm to the server, and/or transmits a distress signal to the other terminal devices when the target gas concentration value is greater than the gas concentration threshold.

The laser gas detection system 100 has a one-touch alarming function. The engineer may set the following through the near-eye display device 120: once the target gas concentration value is greater than the set gas concentration threshold value, automatic alarming is activated. The laser gas detector 110 transmits, to the near-eye display device 120, the gas concentration parameter detected in real time. When the target gas concentration value (or a target gas concentration calculated according to the gas concentration parameter) is relatively large, the near-eye display device 120 initiates an alarm without needing the engineer to transmit an activation instruction or execute an alarming action, which can save a lot of time and save countless lives.

According to an exemplary embodiment of the present disclosure, the near-eye display device 120 is communicably connected to the server and/or the other terminal devices, and the near-eye display device 120 is configured to collect and recognize voice instructions of the engineer, obtain a target gas concentration value and/or a detection report within a specific time period from the server and/or the other terminal devices according to the voice instructions, and project the target gas concentration value and/or the detection report to a field of view of the engineer.

According to an exemplary embodiment of the present disclosure, the laser gas detector 110 may be equipped with a positioning module, such as a global positioning system (GPS) adapted to provide geographic coordinates, so that the near-eye display device 120 exchanges the geographic coordinates. The near-eye display device combines the gas concentration parameter with the geographic coordinates, marks the gas concentration parameter at the geographic coordinates, and projects the gas concentration parameter to the field of view of the wearer. In addition, for example, the near-eye display device 110 is configured to obtain the geographic coordinates of the detection position of the laser gas detector 110, construct a historical inspection map, and project the historical inspection map to the field of view of the wearer. For example, an engineer has detected a community A today, learned that detection data of 21 buildings is xx1, and detection data of 12 buildings is xx2; and the engineer had detected a community B yesterday, learned that data of 3 buildings is xx3. By integrating all of the data, a historical inspection map (for example, content displayed on a left-eye display screen in FIG. 9) of the area can be constructed. There are geographic coordinates and detection data at the geographic coordinates on the map. In another embodiment, the geographic coordinates may also be voluntarily obtained by the near-eye display device 120, for example, the near-eye display device 120 equipped with a GPS module.

Figure 9:
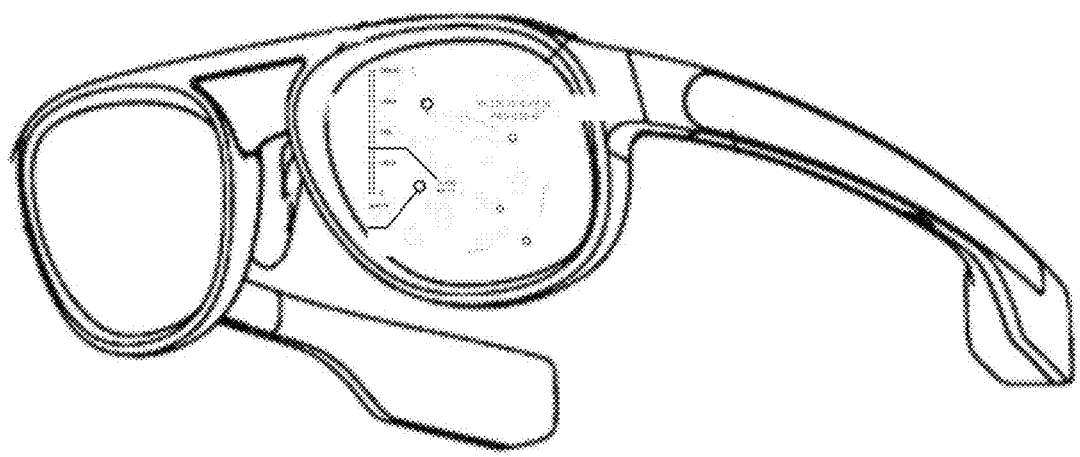
FIG. 9 schematically shows projection of historical detection data to the near-eye range of the wearer in a form of a map according to an exemplary embodiment of the present disclosure.

Still referring to FIG. 9, when an engineer carrying the laser gas detection system 100 arrives at a site to perform a detection task, the engineer may say to the near-eye display device 120: "show the detection results of methane concentration in this area in the past month." The near-eye display device 120, for example, obtains historical detection data from the server through the 5G cellular mobile network and projects a large map of the area to a field of view of the engineer. Historical detection concentration data is displayed at each point on the map in a form of color blocks/graphs/data, so that the engineer can have a rough understanding of the methane concentration in the to-be-detected area, facilitating work of that day. In another embodiment of the present disclosure, the near-eye display device 120 obtains the historical detection data from the server, displays a detection position of the historical detection data in the field of view of the engineer, and displays a variation graph, a variation histogram, or the like of the historical detection data in combination with a detection time, all of which fall within the protection scope of the present disclosure.

According to an exemplary embodiment of the present disclosure, the laser gas detector 110 is a handheld laser methane telemeter, a gimbal laser methane telemeter, or an unmanned aerial vehicle-mounted laser methane telemeter. The near-eye display device 110 is augmented reality (AR) glasses or mixed reality (MR) glasses.

The laser gas detection system provided in the present disclosure incorporates modern display technologies and modern communication facilities to present detection results to an engineer in various intuitive and highly readable forms and project the detection results to a field of view of the engineer through the near-eye display device. The whole process is conducted without manual operations. An engineer can interact with the near-eye display device through voice, and the near-eye display device also has functions such as automatic alarming, which greatly improves working efficiency of detection and emergency repair, and ensures environmental safety and personnel safety during gas mining and transportation.

Second Aspect

Figure 10:
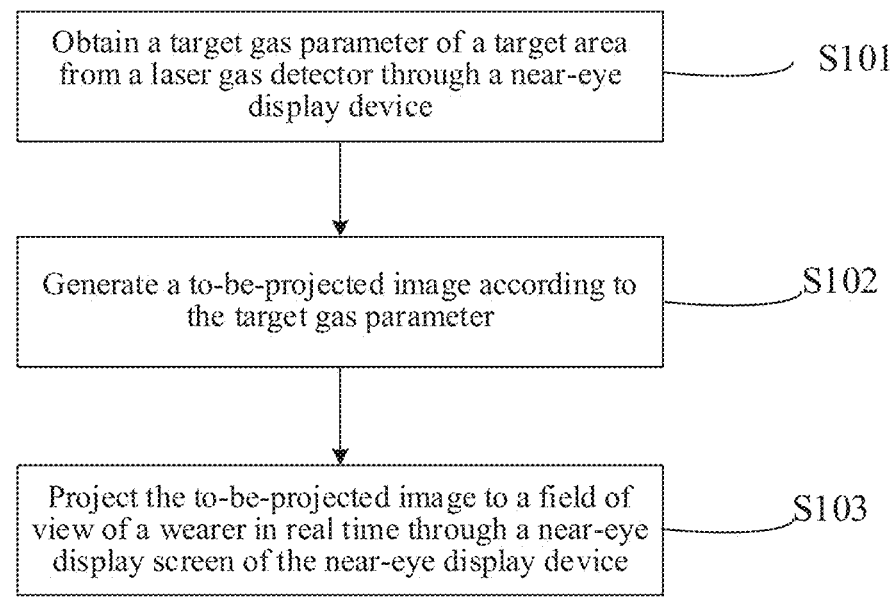
FIG. 10 shows an information display method according to an exemplary embodiment of the present disclosure.

According to an exemplary embodiment of the present disclosure, as shown in FIG. 10, the present disclosure further provides an information display method 10 of a near-eye display device. The method includes the following steps.

In step S101, a gas concentration parameter of a target path is obtained from a laser gas detector through the near-eye display device.

For example, the near-eye display device 120 establishes a Bluetooth connection to a communication interface of the laser gas detector 110. Through the Bluetooth connection, the near-eye display device 120 communicates, in real time, with the laser gas detector 110 that is detecting a target gas on the target path, so as to obtain a gas concentration parameter of the target path in real time. However, the near-eye display device 120 may also communicate, through the Bluetooth connection, with the laser gas detector 110 that has completed the detection, to obtain the gas concentration parameter that has been detected and stored.

In Step S102, a to-be-projected image is generated according to the gas concentration parameter.

The near-eye display device 120 can obtain the gas concentration parameter of the target path. The gas concentration parameter includes a target gas concentration value. Alternatively, the target gas concentration value may be calculated according to the gas concentration parameter (for example, the gas concentration parameter represents an average concentration on the detection path). The near-eye display device 120 directly uses the target gas concentration value as the to-be-projected image, or generate a detection report according to the target gas concentration value and a measurement time. The detection report includes one or more of a histogram, a graph, and a line chart of the target gas concentration value at the measurement time, and is used as the to-be-projected image.

In step S103, the to-be-projected image is projected to a field of view of a wearer in real time through a near-eye display screen of the near-eye display device.

In other words, the laser gas detector 110 may transmit data detected by the laser gas detector to the near-eye display device 120 in real time or asynchronously, and the near-eye display device 120 displays the data.

According to an exemplary embodiment of the present disclosure, in the information display method 10, the near-eye display screen projects the to-be-projected image to a fixed position in the field of view of the wearer or to a detection position of the laser gas detector in the field of view of the wearer.

As shown in FIG. 3A, the target gas concentration value (98765) is projected to a field of view of an engineer through the near-eye display device 120. Since the target gas concentration value is generated according to the gas concentration parameter, and the gas concentration parameter is the real-time detection result of the laser gas detector 110 and is transmitted to the near-eye display device 120 in real time, the target gas concentration value projected to the field of view of the engineer may change in real time. FIG. 3B is a histogram generated according to the detection result, and FIG. 3C is a graph generated according to the detection result. Color blocks may also be displayed, for example, different color blocks are used to identify different target gas concentration ranges. Those skilled in the art can easily understand that other to-be-projected images that can be used to represent the detection result of the laser gas detector 110 are all applicable to the present disclosure, which all fall within the protection scope of the present disclosure. The near-eye display device 120 may also project the to-be-projected image to other fixed positions in the field of view of the engineer, such as a position at a distance of 1 meter directly in front (as shown in FIG. 4), which also fall within the protection scope of the present disclosure. In FIG. 5B, the near-eye display device 120 projects the target gas concentration value to the detection position in the field of view of the engineer in real time. In FIG. 5A, the near-eye display device 120 projects, to the detection position in the field of view of the wearer in real time, the histogram generated according to the target gas concentration value.

According to an exemplary embodiment of the present disclosure, the information display method 10 further includes:

displaying a map through the near-eye display screen, where the map includes the target path;

retrieving historical detection data of an area corresponding to the map; and displaying the historical detection data on the map.

As shown in FIG. 9, the near-eye display device 120, for example, obtains historical detection data from the server through the 5G cellular mobile network and projects a large map of the area to a field of view of the engineer. Historical detection concentration data is displayed at each point on the map in a form of color blocks/graphs/data, so that the engineer can have a rough understanding of the methane concentration in the to-be-detected area, facilitating work of that day. In another embodiment of the present disclosure, the near-eye display device 120 obtains the historical detection data from the server, displays a detection position of the historical detection data in the field of view of the engineer, and displays a variation graph, a variation histogram, or the like of the historical detection data in combination with a detection time, all of which fall within the protection scope of the present disclosure.

The information display method provided in the present disclosure improves working efficiency of engineers at a working site and reduces erroneous determination of potential dangers. The engineer can access detection records over a historical time period or expand an inspection range to make comprehensive judgements. Through the near-eye display device, the detection record is marked on the map for presentation and is projected to the field of view of the engineer, which is clearer and facilitates judgements of the engineer.

Third Aspect

Figure 11:
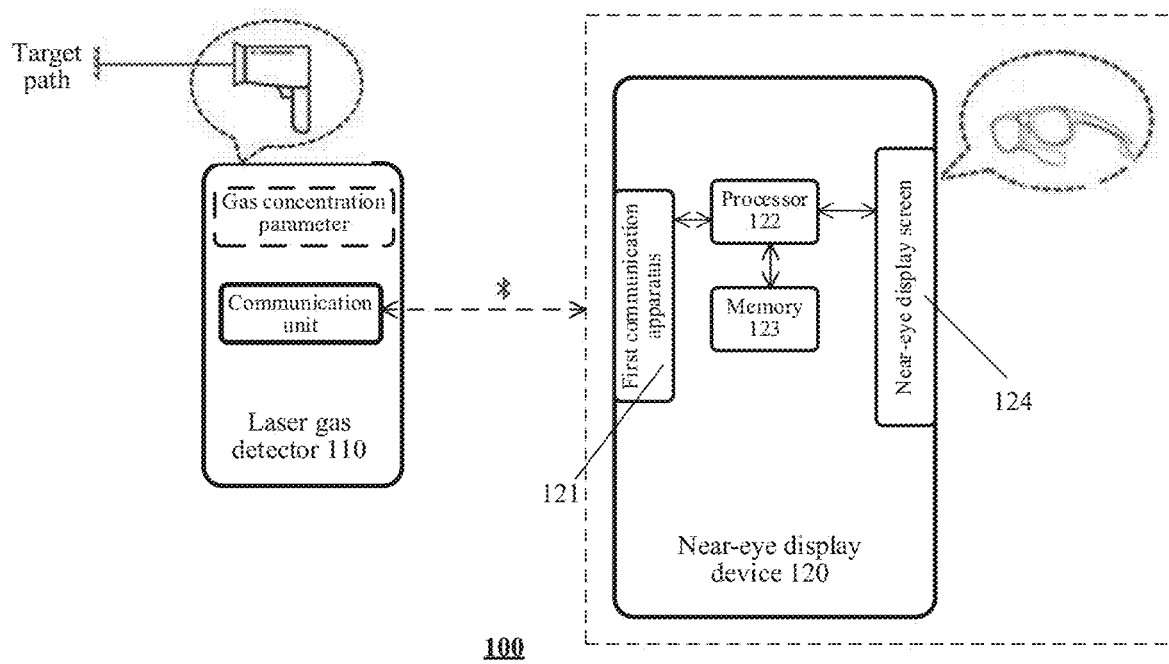
FIG. 11 schematically shows a near-eye display device according to an exemplary embodiment of the present disclosure.

According to an exemplary embodiment of the present disclosure, as shown in FIG. 11, the present disclosure further provides a near-eye display device 120, including: a first communication apparatus 121 (for example, a Bluetooth communication apparatus), one or more processors 122, a memory 123, and a near-eye display screen 124. The one or more processors 122 are communicably connected to the first communication apparatus 121, the memory 123, and the near-eye display screen 124 to transmit data and control operation of a device.

The memory 123 of the near-eye display device 120 stores an application for use with the near-eye display device 120. After being authorized by a user (for example, the user may authorize the near-eye display device 120 to execute the application through one or more of voice instructions, a gesture instruction, and a tap), the application is executed by the one or more processors 122. The near-eye display device 120 in this embodiment is a near-eye display device used in combination with a laser gas detector 110. Alternatively, a conventional near-eye display device may be used, and an application is installed on the near-eye display device to be used with the laser gas detector.

Specifically, referring to FIG. 10, the near-eye display device 120 is capable of executing, by installing application software, instructions for the following step:

obtaining gas concentration parameter of a target path in real time from the laser gas detector 110 through the first communication apparatus 121. For example, the near-eye display device 120 establishes a Bluetooth connection to a communication interface of the laser gas detector 110. Through the Bluetooth connection, the near-eye display device 120 communicates, in real time, with the laser gas detector 110 that is detecting a target gas on the target path, so as to obtain a gas concentration parameter of the target path in real time. However, the near-eye display device 120 may also communicate, through the Bluetooth connection, with the laser gas detector 110 that has completed the detection, to obtain the gas concentration parameter that has been detected and stored.

A to-be-projected image is generated according to the gas concentration parameter. The near-eye display device 120 can obtain the gas concentration parameter of the target path. The gas concentration parameter includes a target gas concentration value. Alternatively, the target gas concentration value may be calculated according to the gas concentration parameter (for example, the gas concentration parameter represents an average concentration on the detection path). The near-eye display device 120 directly uses the target gas concentration value as the to-be-projected image, or generate a detection report according to the target gas concentration value and a measurement time. The detection report includes one or more of a histogram, a graph, and a line chart of the target gas concentration value at the measurement time, and is used as the to-be-projected image.

The to-be-projected image is projected to a field of view of a wearer in real time through the near-eye display screen 124. In other words, the laser gas detector 110 may transmit data detected by the laser gas detector to the near-eye display device 120 in real time or asynchronously, and the near-eye display device 120 displays the data.

According to an exemplary embodiment of the present disclosure, the near-eye display device 120 is capable of executing, by installing application software, instructions for the following steps:

projecting, by the near-eye display screen 124 directly serving as a display device, detected data; or projecting, by the near-eye display screen 124, the to-be-projected image to a fixed position in the field of view of the wearer.

According to an exemplary embodiment of the present disclosure, the near-eye display device 120 is capable of executing, by installing application software, instructions for the following steps:

obtaining physical coordinates of a real-time detection position of the laser gas detector 110 through the first communication apparatus 121; and projecting the to-be-projected image to the detection position in the field of view of the wearer through the near-eye display screen 124.

According to an exemplary embodiment of the present disclosure, the near-eye display device 120 further includes a man-machine interface. The man-machine interface further includes: a microphone configured to collect voice instructions of the wearer; and a voice recognition unit (such as a voice processing chip) communicably connected to the microphone and configured to recognize the voice instructions of the wearer and generate a corresponding control signal. The man-machine interface is communicably connected to the one or more processors 122 to transmit the control signal. The near-eye display device 120 is capable of executing, by installing application software, instructions for the following steps:

obtaining, through the man-machine interface, a voice control signal transmitted by the wearer; and transmitting, through the first communication apparatus 121, the control signal to the laser gas detector 110 to control the laser gas detector 110 to be turned on and/or scan and inspect the target path.

In addition to the manner of voice interaction, the wearer of the near-eye display device 120 may perform human-machine interaction with the near-eye display device 120 through a gesture instruction, a tap, or the like, which all fall within the protection scope of the present disclosure.

Figure 12:
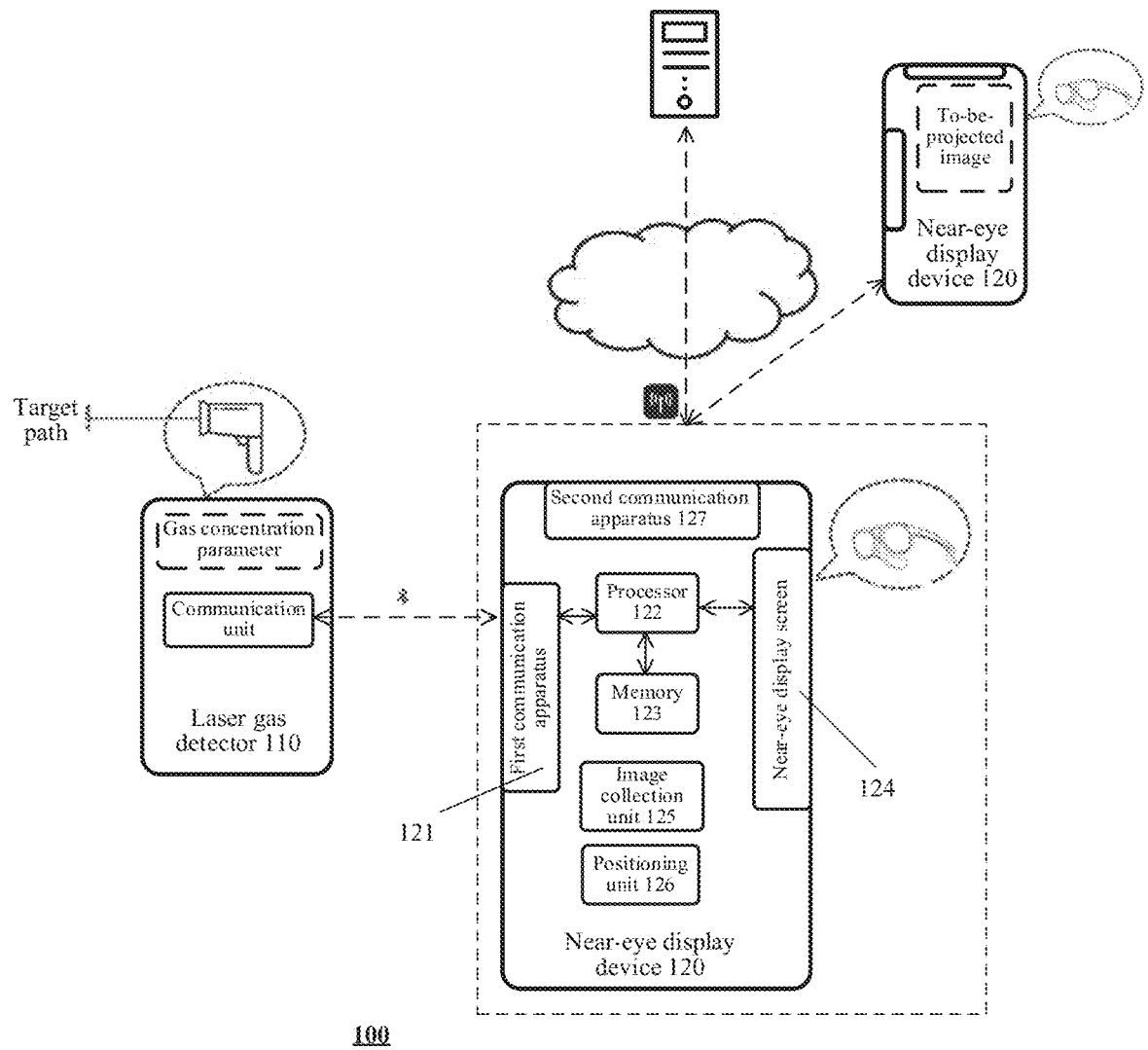
FIG. 12 schematically shows a near-eye display device according to an exemplary embodiment of the present disclosure.

According to an exemplary embodiment of the present disclosure, as shown in FIG. 12, the near-eye display device 120 further includes: an image collection unit 125 (for example, a camera), a positioning unit 126 (for example, a global positioning system), and a second communication apparatus 127 (for example, a 5G cellular mobile network). The one or more processors 122 are communicably connected to the first communication apparatus 121, the second communication apparatus 127, the memory 123, the image collection unit 125, and the positioning unit 126 to transmit data and control operation of a device.

The memory 123 of the near-eye display device 120 stores an application for use with the near-eye display device 120. After being authorized by a user, the application is executed by the one or more processors 122. The first communication apparatus 121 and the second communication apparatus 127 of the near-eye display device 120 may be invoked for processing and transceiving of data, the camera of the near-eye display device 120 may be invoked to serve as the image collection unit 125 to take photographs or record videos, and the global positioning system of the near-eye display device 120 may be invoked to serve as the positioning unit 126 to obtain information about geographic coordinates. The near-eye display device 120 is capable of executing, by installing application software, instructions for the following step:

collecting image data of the target path through the image collection unit 125. The laser gas detector 110 is equipped with a visible beam emitting unit (a visible beam laser). A propagation direction of a visible beam emitted by the visible beam emitting unit is approximately parallel to a propagation direction of a detection laser beam emitted by the laser gas detector 110. A spot position of the visible beam laser indicates an irradiation position of the detection laser beam emitted by the laser gas detector 110, which may be used to guide the image collection unit 125 to collect an image of a gas leak point. The image data of the target path is collected and uploaded to the server, which is convenient for an engineer to show an accurate position of a leak point to management and repair personnel.

Position information is obtained through the positioning unit 126. The global positioning system of the near-eye display device 120 is invoked to serve as the positioning unit 126 to obtain geographic coordinates (for example, number yyy, road xxx) of a position of the near-eye display device 120, and the coordinates are used to determine a position of the engineer during the detection. Subsequent operators may restore the position based on the geographic coordinates and compare surroundings with content of the image data to find an accurate leak position.

The target gas concentration value/detection report, the image data, and the position information are associated with each other. A text file of the target gas concentration value/detection report, an image file, and position information text are named by using a fixed-format file name naming standard, to associate the target gas concentration value/detection report, the image data, and the position information, so as to indicate consistency of the target gas concentration value/detection report and the image data in a recording time and a recording position.

The target gas concentration value/detection report, the image data, and the position information that are associated with each other are transmitted to a server. The second communication apparatus 127 (for example, a 5G cellular mobile network) transmits, to the server, the target gas concentration value/detection report, the image data, and the position information that are associated with each other, and the server performs data processing on the target gas concentration value/detection report, the image data, and the position information that are associated with each other and obtained from different data management terminals. The data processing includes at least: extracting the target gas concentration value and the position information from the detection report. The target gas concentration value may be a maximum value of a target gas concentration, or an average value of the target gas concentration, and may also be a target gas concentration value in the detection report that is finally recorded. The data processing may further include: extracting information such as a regional distribution map of target gas concentrations that is obtained from the detection report through processing and analysis, target gas concentration data that changes over time, or the like.

According to an exemplary embodiment of the present disclosure, the gas concentration parameter includes the target gas concentration value. The near-eye display device 120 further includes a second communication apparatus 127 configured to be communicably connected to the server and/or other terminal devices (as shown in FIG. 12). The near-eye display device 120 is capable of executing, by installing application software, instructions for the following step:

sending an alarm to the wearer, sending an alarm to the server, and/or transmitting a distress signal to the other terminal devices when the target gas concentration value is greater than a gas concentration threshold.

The near-eye display device 120 has a one-touch alarming function. A gas concentration threshold is set, so that once the target gas concentration value is greater than the set gas concentration threshold value, automatic alarming is activated. The laser gas detector 110 transmits, to the near-eye display device 120, the gas concentration parameter detected in real time. When the target gas concentration value (or a target gas concentration calculated according to the gas concentration parameter) is relatively large, the near-eye display device 120 initiates an alarm without needing the engineer to transmit an activation instruction or execute an alarming action, which can save a lot of time and save countless lives.

A way in which the near-eye display device 120 sends a warning to the wearer includes: projecting warning information, flashing lights, projecting specific background colors in the field of view of the wearer, and emitting a beep sound, or the like through a buzzer mounted to the near-eye display device 120.

According to an exemplary embodiment of the present disclosure, the near-eye display device 120 further includes a second communication apparatus 127 configured to be communicably connected to the server and/or the other terminal devices (as shown in FIG. 12). The near-eye display device 120 is capable of executing, by installing application software, instructions for the following step:

obtaining historical detection data within a specific time period from the server and/or the other terminal devices and projecting the historical detection data to the field of view of the wearer. The instruction further includes the following.

(1) Detection data uploaded by other terminal devices in the same area is displayed. In this way, engineers or server-side management personnel can have macroscopic understanding of target gas concentration distribution in a managed area. For example, when a target gas concentration that is relatively high but does not exceed a warning value is detected, the engineers tend to think that there may be a leak point near the position. However, due to flowing and diffusion of gases, it is usually difficult to determine an exact position of the leak point. The engineers may obtain, from the server, target gas concentration data at nearby positions uploaded from other data management terminals (such as near-eye display devices worn by engineers working nearby), and accurately determine a direction of the leak point by combining environmental factors.

(2) Historical detection data of the target path is displayed. The near-eye display device 120, for example, obtains historical detection data from the server through the 5G cellular mobile network and projects a large map of the area to a field of view of the engineer. Historical detection concentration data is displayed at each point on the map in a form of color blocks/graphs/data, so that the engineer can have a rough understanding of the gas concentration in the to-be-detected area, facilitating work of that day. In another embodiment of the present disclosure, the near-eye display device 120 obtains the historical detection data from the server, displays a detection position of the historical detection data in the field of view of the engineer, and displays a variation graph, a variation histogram, or the like of the historical detection data in combination with a detection time, all of which fall within the protection scope of the present disclosure.

The near-eye display device provided in the present disclosure can be used in combination with a laser gas detection apparatus, which can obtain a detection result of the laser gas detection apparatus through communication apparatuses such as a Bluetooth communication apparatus and project the detection result to a field of view of the engineer in real time, and can project the detection result to a position near a detection position in various intuitive and highly readable forms, facilitating operations of the engineer. The near-eye display device has a function of human-machine interaction, so that the engineer can operate with voice throughout the process, freeing hands and avoiding pollution. The near-eye display device further has functions such as photographing, video recording, and one-key alarming, which can be implemented through voice instructions of the engineer or may be automatically triggered. The near-eye display device may upload a detection result or alarm information through a 5G communication module, and obtain an accurate position through the global positioning system, so that repair personnel can rush to the site in time.

Fourth Aspect

Figure 13:
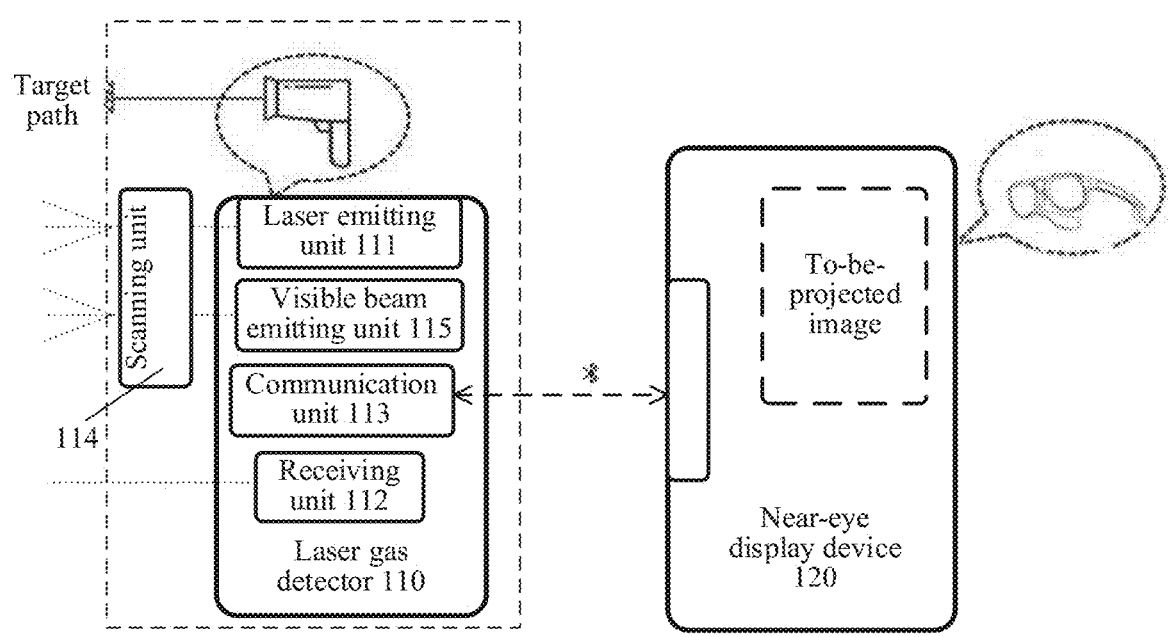
FIG. 13 schematically shows a laser gas detector according to an exemplary embodiment of the present disclosure.

According to an exemplary embodiment of the present disclosure, as shown in FIG. 13, the present disclosure further provides a laser gas detector 110, including: a laser emitting unit 111 configured to emit a detection laser beam; a receiving unit 112 configured to receive an echo signal of the detection laser beam and analyze the echo signal to determine a gas concentration parameter of a detection path along which the laser beam travels; and a communication interface 113 adapted to establish a communication connection to a near-eye display device to exchange the gas concentration parameter and project the gas concentration parameter to a field of view of a wearer through the near-eye display device.

According to an exemplary embodiment of the present disclosure, the communication interface 113 of the laser gas detector 110 is further adapted to exchange directional information corresponding to the detection path, so that the near-eye display device combines and projects, to the field of view of the wearer through combination, the gas concentration parameter and the directional information corresponding to the detection path.

For a gimbal or unmanned aerial vehicle-mounted laser gas detector, information about a directional angle may be obtained through a geomagnetic sensor or a gyroscope mounted to the laser gas detector. For a gimbal laser methane telemeter, the directional information, that is, the current detected direction may be provided by a gimbal. For an unmanned aerial vehicle-mounted laser methane telemeter, the directional information may be provided by an unmanned aerial vehicle.

For a hand-held laser gas detector, when light is relatively dark or a to-be-detected position is relatively close, a visible beam may be emitted through a visible beam emitting apparatus to indicate the to-be-detected position, and the near-eye display device may recognize and locate the to-be-detected position according to a spot of the visible beam, and project the to-be-projected image to the detection position in the field of view of the engineer. If the light is bright or the to-be-detected position is far away or in other situations where an indicator spot cannot be seen clearly, a red dot sight may be used. Firstly aligning a red dot of the red dot sight is to a green dot of the visible indicator light, and then, when the green dot is invisible, aiming at the detection position with the red dot in the red dot sight rather than the green dot.

According to an exemplary embodiment of the present disclosure, the laser gas detector 110 further includes a positioning unit adapted to provide geographic coordinates. The communication interface 113 is further adapted to exchange the geographic coordinates with the near-eye display device, so that the near-eye display device combines and projects the gas concentration parameter and the geographic coordinates to the field of view of the wearer.

The laser gas detector 110 may be equipped with a positioning module, such as a GPS, which is adapted to provide geographic coordinates, so that the near-eye display device 120 exchanges the geographic coordinates, combines the gas concentration parameter with the geographic coordinates, marks the gas concentration parameter at the geographic coordinates, and projects the gas concentration parameter to the field of view of the wearer. In addition, for example, the near-eye display device 110 is configured to obtain the geographic coordinates of the detection position of the laser gas detector 110, construct a historical inspection map, and project the historical inspection map to the field of view of the wearer. For example, an engineer has detected a community A today, learned that detection data of 21 buildings is xx1, and detection data of 12 buildings is xx2; and the engineer had detected a community B yesterday, learned that data of 3 buildings is xx3. By integrating all of the data, a historical inspection map (for example, content displayed on a left-eye display screen in FIG. 9) of the area can be constructed. There are geographic coordinates and detection data at the geographic coordinates on the map. In another embodiment, the geographic coordinates may also be voluntarily obtained by the near-eye display device 120, for example, the near-eye display device 120 equipped with a GPS module.

According to an exemplary embodiment of the present disclosure, as shown in FIG. 13, the laser gas detector 110 further includes a scanning unit 114. The scanning unit 114 is configured to rotate within a specific range according to the control signal to emit the detection laser beam for scanning, thereby detecting the target path through scanning.

According to an exemplary embodiment of the present disclosure, as shown in FIG. 13, the laser gas detector 110 further includes a visible beam emitting unit 115 configured to emit a visible beam which has a propagation direction parallel to a propagation direction of the detection laser beam, and is configured to locate a real-time detection position of the laser gas detector 110. The above image collection unit 125 of the near-eye display device 120 is configured to recognize a spot of a visible beam from the image data to locate the real-time detection position.

As shown in FIG. 6, the visible beam emitting unit 115 emits a visible beam parallel to the detection laser beam, and an actual detection position is identified by using a spot position of the visible beam. As shown in FIG. 7, the near-eye display device 120 may use an image recognition module to recognize, from the image data, a pixel corresponding to the visible spot of the visible beam by using differences in colors and brightness, and then mark a rectangular area by using the pixel as a center to characterize the area.

In addition, for a handheld laser gas detector, a visible beam may be emitted through the visible beam emitting unit 115, and the near-eye display device 120 performs positioning according to a spot of the visible beam to obtain a directional angle. The near-eye display device 120 calculates physical coordinates of the real-time detection position according to the directional angle, that is, a position relative to the near-eye display device, and projects the to-be-projected image to the detection position in the field of view of the engineer.

In another exemplary embodiment of the present disclosure, the laser gas detector 110 further includes a display screen configured to display a gas concentration parameter detected real-time.

The laser gas detector provided in the present disclosure may be used in combination with the near-eye display device, has the communication interface capable of transmitting data and control instructions, can transmit a detection result back to the near-eye display device for display, and may also receive control instructions from the near-eye display device, to perform turn-on, rotation, scanning, or other operations. The communication interface may be a factory configuration or later mounted. The laser gas detector further has a visible beam emitting unit, which helps engineers locate a detection position and perform subsequent work such as image collection, and may also provide information about the directional angle to the near-eye display device.

Fifth Aspect

According to an exemplary embodiment of the present disclosure, the present disclosure further provides a data management method of a laser gas detector. The method includes the following steps.

A near-eye display device establishes a communication connection to a communication interface of the laser gas detector, and obtains a gas concentration parameter of a target path in real time through the communication connection.

The near-eye display device generates a to-be-projected image according to the gas concentration parameter; and The near-eye display device projects the to-be-projected image to a field of view of a wearer in real time.

According to an exemplary embodiment of the present disclosure, in the above data management method, the gas concentration parameter includes a target gas concentration value, and the to-be-projected image includes the target gas concentration value and/or a detection report generated according to the target gas concentration value. The detection report includes one or more of a histogram, a graph, and a color block diagram that are generated according to the target gas concentration value and a measurement time.

According to an exemplary embodiment of the present disclosure, in the above data management method, the near-eye display device is communicably connected to a server and/or other terminal devices, and the data management method further includes the following step.

The near-eye display device transmits the target gas concentration value and/or the detection report to the server and/or the other terminal devices in real time.

The server integrates and manages the target gas concentration value and/or the detection report obtained from the same data processing terminal (which, for example, is the near-eye display device, and the near-eye display device is an embodiment of the data processing terminal, helping the engineer obtain a detection result more intuitively and quickly, and other engineers may also use data processing terminals of other forms such as a mobile phone) or a different data processing terminal.

According to an exemplary embodiment of the present disclosure, in the above data management method, the near-eye display device is configured to collect image data of the target path, and the method further includes:

associating, by the near-eye display device, a target gas concentration value with the image data and transmitting the target gas concentration value and the image data to the server and/or the other terminal devices.

The image data of the target path is collected and uploaded to the server, which is convenient for an engineer to show an accurate position of a leak point to management and repair personnel.

According to an exemplary embodiment of the present disclosure, in the above data management method, the near-eye display device is configured to obtain current position information, and the method further includes:

associating, by the near-eye display device, a target gas concentration value with the position information and transmitting the target gas concentration value and the position information to the server and/or the other terminal devices.

According to the data management method provided in the present disclosure, the detection result of the laser gas detection system can be backed up and uploaded, or the image data collected by the near-eye display device may also be associated with the current detection result through position information obtained through a global positioning system, and then the associated information is synchronously stored and uploaded to the server or other collaborative engineers through the 5G communication module. The engineer may also download a historical detection record from the server or terminal devices of the other engineers through the near-eye display device, which can help the engineer integrate the information in time and space to make judgements.

It should be noted that the foregoing descriptions are merely exemplary embodiments of the present disclosure, but are not intended to limit the present disclosure. Although the present disclosure has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made and the like within the spirit and principle of the present disclosure shall fall within the protection scope of the present disclosure.

What is claimed is:

1. A laser gas detector, comprising:
an emitter configured to emit a detection laser beam;
a receiver configured to receive an echo signal of the detection laser beam and analyse the echo signal to determine a gas concentration parameter of a detection path along which the detection laser beam travels; and
a communication interface configured to:
establish a communication connection to a near-eye display device;
transmit the gas concentration parameter to the near-eye display device for the near-eye display device to project the gas concentration parameter to a field of view of a wearer of the near-eye display device; and
transmit directional information corresponding to the detection path, so that the near-eye display device combines and projects the gas concentration parameter and the directional information corresponding to the detection path to the field of view of the wearer of the near-eye display device.

2. The laser gas detector according to claim 1, wherein the laser gas detector obtains geographic coordinates of the laser gas detector; and
wherein the communication interface is further configured to provide the geographic coordinates to the near-eye display device, so that the near-eye display device combines and projects the gas concentration parameter and the geographic coordinates to the field of view of the wearer of the near-eye display device.

3. The laser gas detector according to claim 2, wherein the communication interface is further configured to receive instruction information from the near-eye display device and perform an operation in accordance with the instruction information.

4. The laser gas detector according to claim 1, wherein the laser gas detector is a handheld laser methane telemeter, further comprises a visible beam emitter configured to emit a visible beam which has a propagation direction corresponding to a direction indicated by the detection path along which the detection laser beam travels, and is configured to provide the directional information.

5. The laser gas detector according to claim 4, further comprising a red dot sight configured to provide the directional information.

6. The laser gas detector according to claim 1, wherein the laser gas detector is a gimbal laser methane telemeter configured to provide the directional information through a gimbal; and
wherein the laser gas detector is an unmanned aerial vehicle-mounted laser methane telemeter configured to provide the directional information through an unmanned aerial vehicle.

7. A method of operating a laser gas detector, the method comprising:
emitting a detection laser beam;
receiving an echo signal of the detection laser beam;
analysing the echo signal to determine a gas concentration parameter of a detection path along which the detection laser beam travels;
establishing a communication connection to a near-eye display device;
transmitting the gas concentration parameter to the near-eye display device for the near-eye display device to project the gas concentration parameter to a field of view of a wearer of the near-eye display device; and
transmitting directional information corresponding to the detection path, so that the near-eye display device combines and projects the gas concentration parameter and the directional information corresponding to the detection path to the field of view of the wearer of the near-eye display device.

8. The method according to claim 7, further comprising:
obtaining geographic coordinates of the laser gas detector; and
providing the geographic coordinates to the near-eye display device, so that the near-eye display device combines and projects the gas concentration parameter and the geographic coordinates to the field of view of the wearer of the near-eye display device.

9. The method according to claim 8, further comprising:
receiving instruction information from the near-eye display device; and
performing an operation in accordance with the instruction information.

10. The method according to claim 7, wherein the laser gas detector is a handheld laser methane telemeter, and
wherein the method further comprises emitting a visible beam which has a propagation direction corresponding to a direction indicated by the detection path along which the detection laser beam travels, and is configured to provide the directional information.

11. The method according to claim 10, wherein the laser gas detector comprises a red dot sight configured to provide the directional information.

12. The method according to claim 7, wherein the laser gas detector is a gimbal laser methane telemeter attached to an unmanned aerial vehicle, and
wherein the method further comprises:
providing the directional information through a gimbal; and
providing the directional information through the unmanned aerial vehicle.

13. A non-transitory computer readable storage medium storing instructions for operating a laser gas detector, when the instructions are executed by a processor of the laser gas detector, the laser gas detector is configured to perform steps comprising:
emitting a detection laser beam;
receiving an echo signal of the detection laser beam;
analysing the echo signal to determine a gas concentration parameter of a detection path along which the detection laser beam travels;
establishing a communication connection to a near-eye display device;
transmitting the gas concentration parameter to the near-eye display device for the near-eye display device to project the gas concentration parameter to a field of view of a wearer of the near-eye display device; and
transmitting directional information corresponding to the detection path, so that the near-eye display device combines and projects the gas concentration parameter and the directional information corresponding to the detection path to the field of view of the wearer of the near-eye display device.

14. The non-transitory computer readable storage medium according to claim 13, further comprising instructions for configuring the laser gas detector to perform steps further comprising:
obtaining geographic coordinates of the laser gas detector; and
providing the geographic coordinates to the near-eye display device, so that the near-eye display device combines and projects the gas concentration parameter and the geographic coordinates to the field of view of the wearer of the near-eye display device.

15. The non-transitory computer readable storage medium according to claim 13, wherein the laser gas detector is a handheld laser methane telemeter, and
wherein the non-transitory computer readable storage medium further comprises instructions for configuring the laser gas detector to perform a step further comprising emitting a visible beam which has a propagation direction corresponding to a direction indicated by the detection path along which the detection laser beam travels, and is configured to provide the directional information.

16. The non-transitory computer readable storage medium according to claim 15, wherein the laser gas detector comprises a red dot sight configured to provide the directional information.

17. The non-transitory computer readable storage medium according to claim 13, wherein the laser gas detector is a gimbal laser methane telemeter attached to an unmanned aerial vehicle, and wherein the non-transitory computer readable storage medium further comprises instructions for configuring the laser gas detector to perform steps comprising:

providing the directional information through a gimbal; and providing the directional information through the unmanned aerial vehicle.

\* \* \* \* \*